United States Patent
Cho et al.

(10) Patent No.: US 7,689,315 B2
(45) Date of Patent: Mar. 30, 2010

(54) SEMICONDUCTOR EQUIPMENT CONTROL SYSTEM AND METHOD

(75) Inventors: Pyong-II Cho, Gyeonggi-do (KR);
Hyun-Sik Sim, Gyeonggi-do (KR);
Kyoung-Hwan Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 11/877,542

(22) Filed: Oct. 23, 2007

(65) Prior Publication Data
US 2008/0097640 A1  Apr. 24, 2008

(30) Foreign Application Priority Data
Oct. 23, 2006 (KR) .................. 10-2006-0103059

(51) Int. Cl.
G06F 19/00 (2006.01)
G05B 11/01 (2006.01)
G06F 11/30 (2006.01)
G21C 17/00 (2006.01)

(52) U.S. Cl. .................. 700/121; 700/19; 700/20; 700/117; 700/169; 700/177; 702/182; 702/183

(58) Field of Classification Search ............ 700/19–20, 700/117, 121, 160, 169, 177; 702/180–183
See application file for complete search history.

(56) References Cited

U.S. PATENT DOCUMENTS 5,859,964 A * 1/1999 Wang et al. .................. 714/48
6,000,830 A * 12/1999 Asano et al. ................. 700/121
6,442,446 B1 * 8/2002 Nakamura et al. ........... 700/121

(Continued)

FOREIGN PATENT DOCUMENTS

JP  8-167547  6/1996

(Continued)

OTHER PUBLICATIONS

English language abstract of Japanese Publication No. 8-167547, Jun. 25, 1996.

(Continued)

*Primary Examiner*—Ramesh B Patel

(57) ABSTRACT

A semiconductor equipment control system and method is provided. The semiconductor equipment control system preferably includes semiconductor equipment having a process recipe stored therein and a host connected to the semiconductor equipment through a network. The host preferably includes a database in which a reference recipe is stored and is preferably configured to receive and compare a final modification time of the process recipe with a final modification time of the reference recipe. When the final modifications times are equal, the host is preferably configured to instruct the semiconductor equipment to perform a process according to the process recipe. When the final modification times are different, the host is preferably configured to check a recipe body of the process recipe against a recipe body of the reference recipe to determine if the process recipe is within an established tolerance. If the process recipe is within tolerance, the host may instruct the semiconductor equipment to perform the process according to the process recipe. If the process recipe is not within tolerance, the host preferably interlocks the process. Using this semiconductor equipment and control method, unconditional checking of the process recipe body can be eliminated, thereby resulting in significant time savings and a more efficient manufacturing process.

20 Claims, 4 Drawing Sheets

U.S. PATENT DOCUMENTS

| | | | |
|---|---|---|---|
| 6,470,227 B1 * | 10/2002 | Rangachari et al. | 700/95 |
| 6,587,744 B1 * | 7/2003 | Stoddard et al. | 700/121 |
| 6,615,098 B1 * | 9/2003 | Bode et al. | 700/121 |
| 6,618,692 B2 * | 9/2003 | Takahashi et al. | 702/188 |
| 6,735,493 B1 * | 5/2004 | Chou et al. | 700/121 |
| 6,909,934 B1 | 6/2005 | Chang | |
| 7,127,320 B1 * | 10/2006 | Brown et al. | 700/121 |
| 7,209,798 B2 * | 4/2007 | Yamashita et al. | 700/121 |
| 7,449,349 B2 * | 11/2008 | Wada et al. | 438/14 |
| 2003/0150908 A1 * | 8/2003 | Pokorny et al. | 235/375 |
| 2005/0256669 A1 * | 11/2005 | Mitsui | 702/123 |

FOREIGN PATENT DOCUMENTS

| | | |
|---|---|---|
| JP | 2003-037032 | 2/2003 |
| KR | 1997-063608 | 9/1997 |
| KR | 2002-0064621 | 8/2002 |
| KR | 2003-0093816 | 12/2003 |
| KR | 10-2004-0050973 | 6/2004 |
| KR | 10-0580803 | 5/2006 |

OTHER PUBLICATIONS

English language abstract of Korean Publication No. 2003-0093816, Dec. 11, 2003.

English language abstract of Korean Publication No. 10-0580803, May 10, 2006.

* cited by examiner

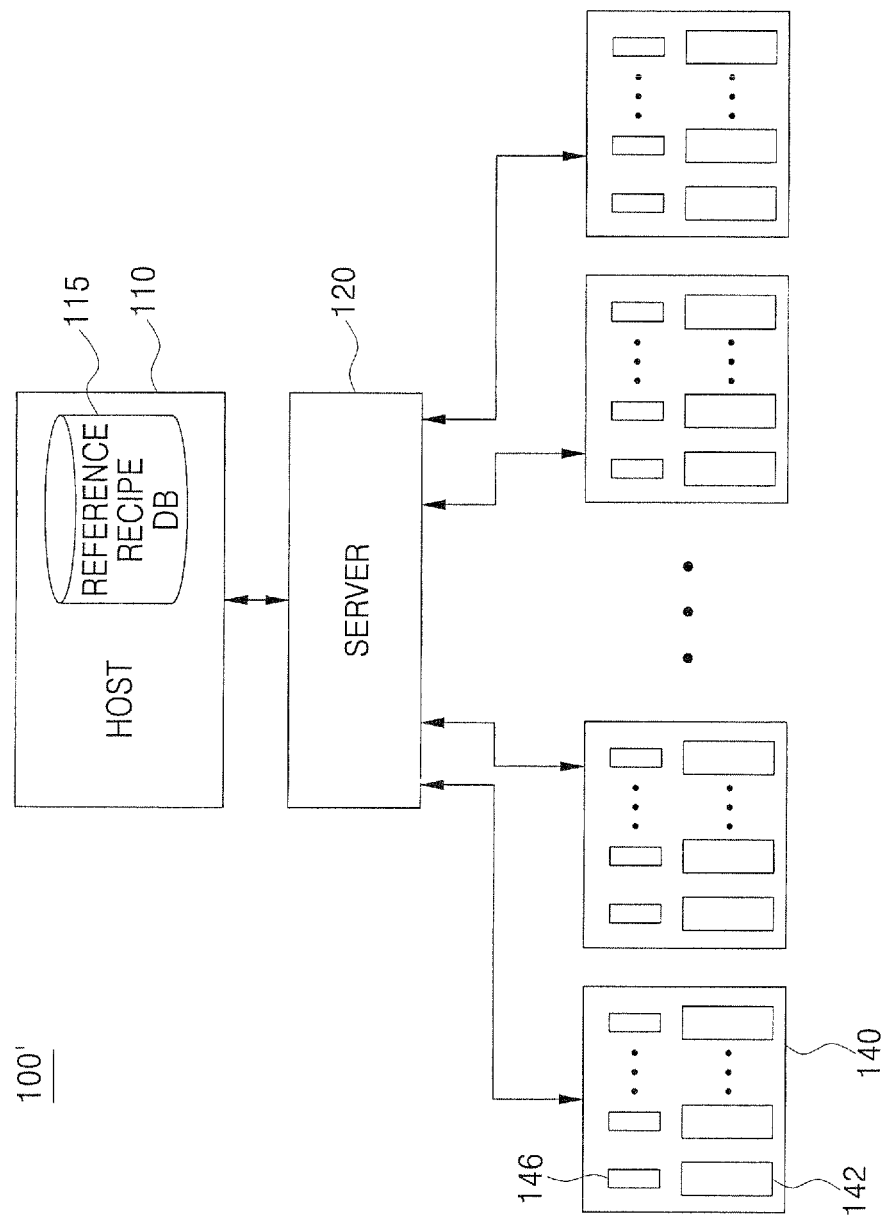

SEMICONDUCTOR EQUIPMENT CONTROL SYSTEM AND METHOD

CROSS-REFERENCE TO RELATED APPLICATION

This application claims the benefit of Korean Patent Application No. 2006-103059, filed Oct. 23, 2006, the disclosure of which is hereby incorporated herein by reference in its entirety.

BACKGROUND OF THE INVENTION

1. Field of the Invention

The present invention relates to a system and method for controlling operation of semiconductor equipment. More particularly, this invention relates to a system and method of using semiconductor equipment to verify the contents of a process recipe and perform a semiconductor device manufacturing process using an appropriate recipe.

2. Description of Related Art

Generally, a semiconductor device manufacturing method includes a deposition process in which a material layer is formed on a semiconductor substrate, a photolithography process in which a mask layer is formed on the material layer and the mask layer is patterned to form a mask pattern, an etching process in which the material layer is etched using the mask pattern as an etching mask, an ion implantation process in which impurity ions are implanted using the mask pattern as an ion implantation mask, various annealing processes, and other processes. To generate a high manufacturing yield, these processes should be precisely managed and controlled according to a predetermined sequence using a semiconductor equipment control system.

Most of these processes are controlled with respect to a single cassette in which a plurality of wafers in a single lot is mounted. For example, in a dry etching process using plasma, a cassette containing a lot of about twenty-five wafers is loaded into a load port of the semiconductor equipment to perform the dry etching process. The semiconductor equipment control system then reads a process program identification (ID) from the cassette loaded in the load port and searches for a corresponding process recipe (e.g., conditions for performing the process) pre-stored in the semiconductor equipment. The semiconductor equipment then performs the process according to the process recipe.

FIG. 1 is a flowchart illustrating a conventional semiconductor equipment control method. Referring to FIG. 1, after loading a wafer lot (typically consisting of about 25 wafers) into the load port of the semiconductor equipment and searching for the process recipe corresponding to the lot, a host installed in the semiconductor equipment control system checks the entire recipe body of the searched process recipe (S10). Unfortunately, since the recipe body of the process recipe includes numerous specific conditions for performing a process (including, for example, a process environment, a process sequence, and a process type), it may take as long as ten minutes or longer to check the recipe body. To check the recipe body of the process recipe, the host compares values of the checked process recipe contents with the contents of a reference recipe (e.g., conditions appropriate to perform a process) stored in the host and then, determines whether the values of the checked process recipe are within an allowable tolerance range with respect to the reference recipe values (S30).

When the values of the checked process recipe are within the allowable tolerance range with respect to the reference recipe values, the host transmits a predetermined control signal to the semiconductor equipment to allow the semiconductor equipment to perform a process according to the checked process recipe (S70). When the values of the checked process recipe are not within tolerance of the reference recipe, however, the host transmits an interlock signal to the semiconductor equipment to keep the semiconductor equipment from performing a process according to the process recipe (S50).

Unfortunately, since the host searches for a process recipe and checks the recipe body of the process recipe whenever the lot is loaded in the semiconductor equipment, regardless of whether the process recipe has been modified, this unconditional checking procedure results in an unnecessary loss of process time. In particular, where the values of the pre-checked process recipes stored in the semiconductor equipment are within tolerance of the reference recipe, since most process recipes are not modified until they correspond to a subsequent lot, the conventional method of unconditionally checking the recipe body of every process recipe results in unnecessary delay and a corresponding decrease in productivity.

The industry would therefore benefit from a system and method for controlling semiconductor equipment that result in increased productivity by reducing or eliminating the unnecessary delay associated with conventional unconditional recipe checking.

SUMMARY OF THE INVENTION

According to various principles of the present invention, the problem described above is solved by providing a semiconductor equipment control system and method that is capable of minimizing the amount of time taken to check a recipe body of a process recipe. Accordingly, the principles of the present invention enable a semiconductor equipment control system and method that is capable of rapidly performing a semiconductor manufacturing process and thereby maximizing productivity.

According to one aspect of the present invention, a semiconductor equipment control system may include semiconductor equipment having a process recipe stored therein. A host having a database in which a reference recipe is stored may be connected to the semiconductor equipment through a network. The host preferably compares a final modification time of the process recipe with a final modification time of the reference recipe to determine whether the recipe body checking process should be performed.

When the final modification time of the process recipe is different from the final modification time of the reference recipe, the host may check the recipe body of the process recipe. When the final modification time of the process recipe is equal to the final modification time of the reference recipe, however, the semiconductor equipment preferably performs a process according to the process recipe. The recipe body may include a process environment, a process sequence, and a process type.

To check the recipe body, the host may compare values of the process recipe and the reference recipe to determine whether the process recipe values are within an allowable tolerance range of the reference recipe values. When the values of the process recipe are within tolerance of the reference recipe, the host may update a final modification time of the reference recipe and perform a process according to the process recipe. However, when the values of the process recipe are not within tolerance of the reference recipe, the host may interlock the process.

According to a still further aspect of the present invention, a semiconductor equipment control method may include checking a final modification time of a process recipe stored in the semiconductor equipment and comparing the checked final modification time of the process recipe with a final modification time of a reference recipe stored in a database. When the checked modification time of the process recipe is equal to the final modification time of the reference recipe, the control method may further include performing a process according to the process recipe.

The control method may further include checking a recipe body of the process recipe when the checked modification time of the process recipe is different from the final modification time of the reference recipe. The recipe body may include a process environment, a process sequence, and a process type. The control method may also include comparing a value of the checked process recipe with a value of the reference recipe, and determining whether the value of the process recipe is within an established tolerance of the reference recipe. When the value of the process recipe is within tolerance of the reference recipe value, the control method may include updating a final modification time of the reference recipe. When the value of the process recipe is within tolerance of the reference recipe, the control method also preferably includes performing a process according to the process recipe. When the process recipe is not within tolerance of the reference recipe, the control method may include interlocking the process.

In yet another embodiment, the semiconductor equipment may include a plurality of process chambers. In this embodiment, checking the final modification time of the process recipe may be performed separately with respect to each chamber installed in the semiconductor equipment.

According to further principles of the present invention, a semiconductor equipment control method may include instructing a host to request a final modification time of a process recipe from semiconductor equipment connected to the host through a network, instructing the semiconductor equipment to provide the final modification time to the host, causing the host to compare the final modification time of the process recipe with a final modification time of a corresponding reference recipe stored in the host, and causing the host to transmit a control signal to the semiconductor equipment to perform a process according to the process recipe when the final modification time of the process recipe is equal to the final modification time of the reference recipe. When the final modification time of the process recipe is different from the final modification time of the reference recipe, the control method may include instructing the host to check a recipe body of the process recipe The recipe body may include a process environment, a process sequence, and a process type.

The host may further compare values of the checked process recipe and the reference recipe, and determine whether the checked process recipe is within tolerance of the reference recipe. When values of the checked process recipe are within an allowable tolerance range of the values of the reference recipe, the host may control the semiconductor equipment to perform a process according to the process recipe and may further update the final modification time of the reference recipe stored therein to be equal to the final modification time of the process recipe. When the checked process recipe is not within tolerance of the reference recipe, the host may control the semiconductor equipment to interlock the process.

BRIEF DESCRIPTION OF THE DRAWINGS

The foregoing and other objects, features and advantages of the invention will become more readily apparent from the following description of preferred embodiments of the invention, as illustrated in the accompanying drawings. It should be noted that the drawings are not necessarily to scale, with emphasis instead being placed upon illustrating the principles of the invention through the accompanying drawings, in which:

FIG. 4 is a schematic block diagram of a semiconductor equipment control system in accordance with another exemplary embodiment of the present invention.

DETAILED DESCRIPTION OF THE INVENTION

The principles of the present invention will now be described more fully with respect to various preferred embodiments thereof. It should be recognized, however, that this invention may be embodied in many different forms and should not be construed as being limited to the specific embodiments set forth herein. Rather, these exemplary embodiments provide an enabling disclosure and best mode of practicing the invention that will convey the full scope of the invention to those skilled in the art.

Figure 1:
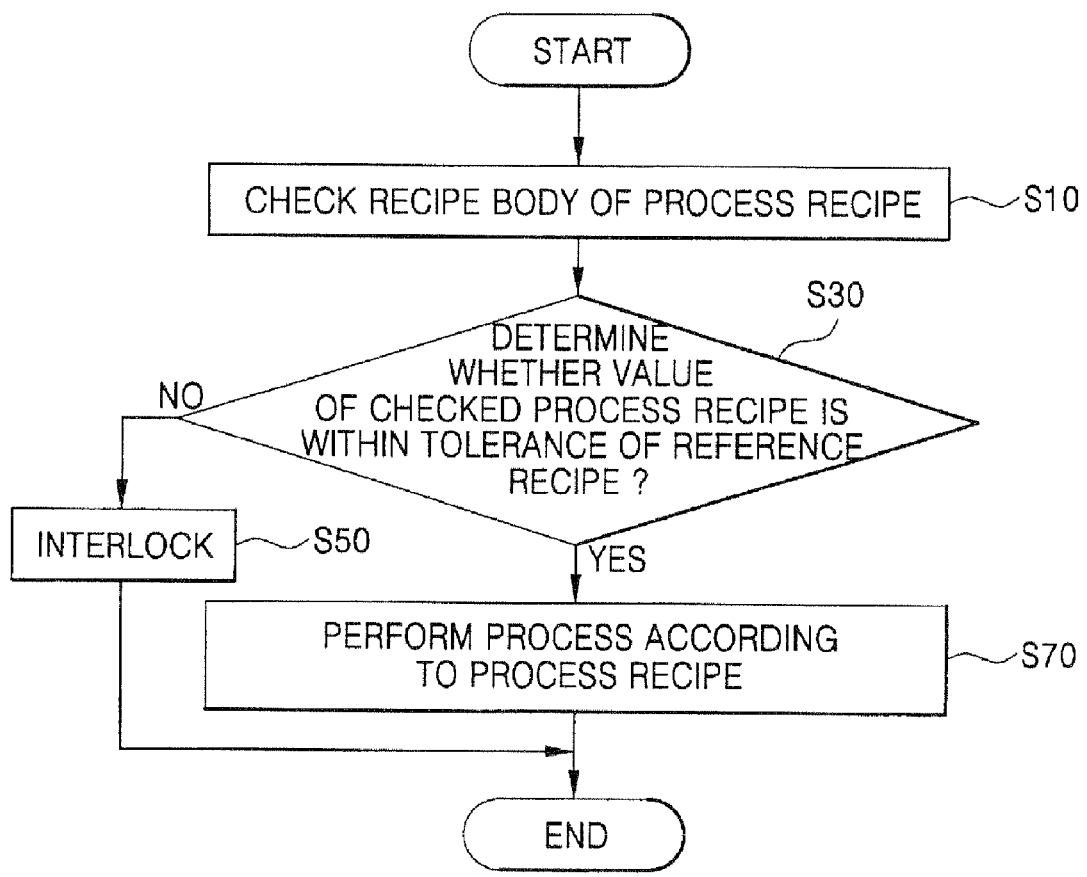
FIG. 1 is a flowchart illustrating a conventional semiconductor equipment control method.
Figure 2:
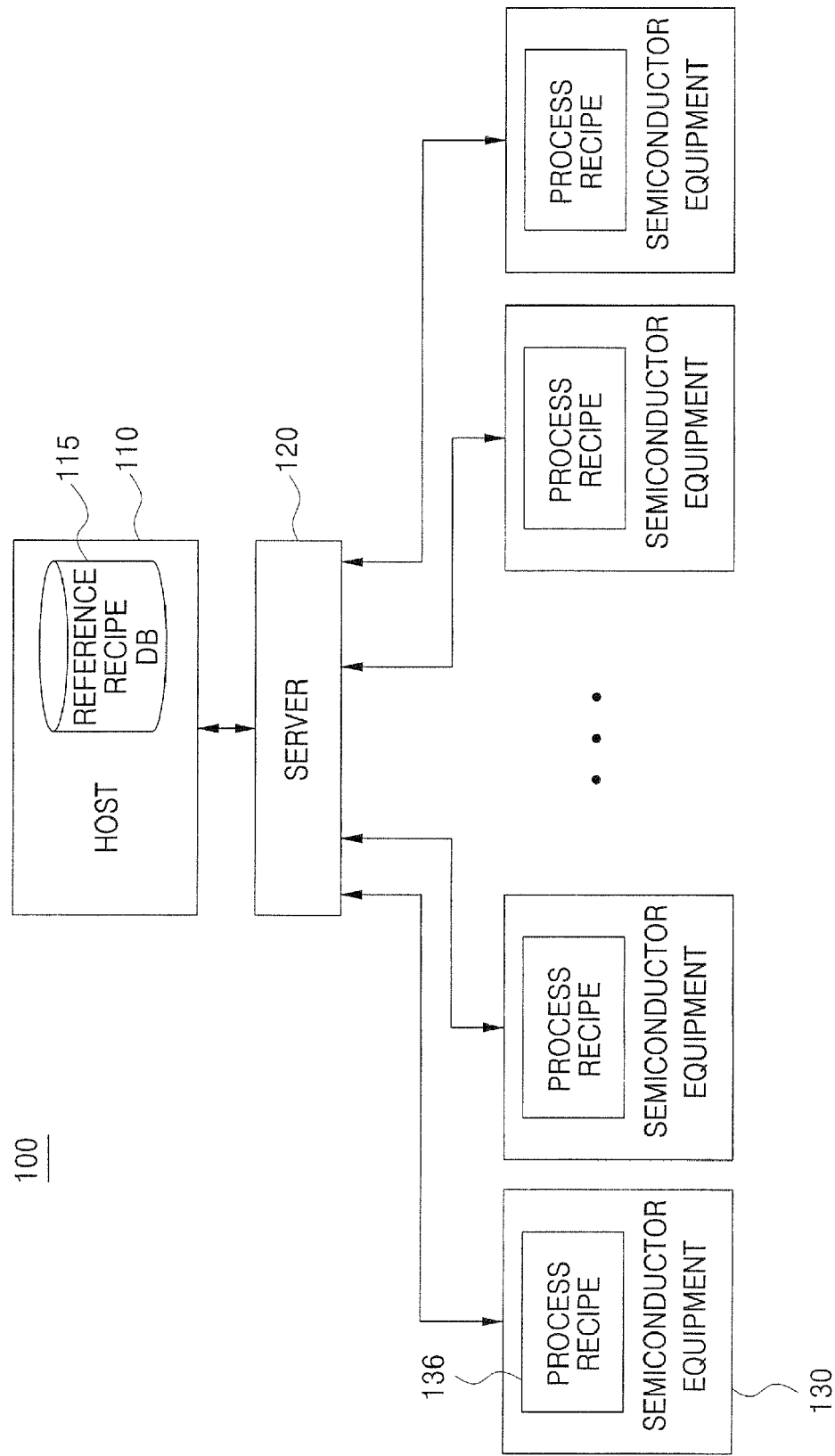
FIG. 2 is a schematic block diagram of a semiconductor equipment control system in accordance with an exemplary embodiment of the present invention.

FIG. 2 is a schematic block diagram of a semiconductor equipment control system 100 in accordance with an exemplary embodiment of the present invention. Referring to FIG. 2, the semiconductor equipment control system 100 preferably includes a plurality of semiconductor equipment 130 for performing semiconductor manufacturing processes, a host computer 110 ("host") for controlling the processes being performed by the semiconductor equipment 130, and a server 120 electrically connected to the semiconductor equipment 130 and the host 110 for bi-directionally transmitting various data and control signals.

The semiconductor equipment 130 is preferably configured to perform various semiconductor device manufacturing processes including, for instance, a deposition process, a photolithography process, an etching process, an ion implantation process, various annealing processes, and other processes. The semiconductor equipment 130 preferably includes a data storage part, in which a process recipe 136 (containing conditions for performing a process), is stored in a file format. A controller for controlling operation of the semiconductor equipment 130 preferably operates the semiconductor equipment 130 to perform a process according to the contents of the process recipe 136 (referred to herein as the "recipe body"). The recipe body may include a process environment, a process sequence, and a process type for performing a process.

In some instances, the recipe body may be partially modified by a process manager or the controller to finely adjust the process conditions and optimally perform a process. In such cases, time data corresponding to the time at which the modification was made (referred to herein as the "modification time") of the process recipe 136 is automatically stored in the data storage part of the semiconductor equipment 130.

The server 120 may be connected to the respective semiconductor equipment 130 and the host 110 through corresponding network connections. In addition, the server 120 is preferably configured to transmit various data and control signals from the host 110 to the semiconductor equipment 130, and to transmit data or other signals output from the semiconductor equipment 130 to the host 110. The semiconductor equipment 130, the server 120, and the host 110 may, for example, communicate with each other and share data using the Semiconductor Equipment Communication Standard (SECS) protocol. The SECS protocol provides a standard for enabling mutually recognizable communication between the semiconductor equipment 130, the server 120, and the host 110. The server 120 and the host 110 may also, however, communicate with each other and receive or transmit data through any generally known communication standard, such as the Transmission Control Protocol/Internet Protocol (TCP/IP), for instance.

The host 110 is preferably configured to control a process being performed by the semiconductor equipment 130 through the server 120. In particular, the host 110 preferably includes a database 115, in which a reference recipe corresponding to a process being performed by the semiconductor equipment 130 is stored. The reference recipe may include conditions appropriate to perform the process, with specific values corresponding to those conditions. The reference recipe may further include an allowable tolerance range (including, for instance, upper and lower limit points) for each of the process conditions, within which tolerance range the process may appropriately be performed. The host 110 is preferably configured to determine under certain circumstances, whether the contents of the process recipe (the recipe body) is within tolerance of the reference recipe and to control whether or not the semiconductor equipment 130 performs the process according to that determination.

Before checking the recipe body of the process recipe 136, however, the host 110 preferably compares a final modification time of the process recipe 136 with a final modification time of the reference recipe to determine whether checking the recipe body is even necessary. More specifically, the host 110 preferably controls the semiconductor equipment 130 to check the recipe body of the process recipe 136 only when the final modification time of the process recipe 136 is different from the final modification time of the reference recipe. When the final modification time of the process recipe 136 is equal to the final modification time of the reference recipe, the host 110 preferably performs the process in the semiconductor equipment 130 according to the process recipe 136 without checking the recipe body of the process recipe.

Other functions of the host 110 will now be described in further detail with additional reference to FIG. 3, which illustrates a semiconductor equipment control method in accordance with an exemplary embodiment of the present invention. Specifically, FIG. 3 is a flowchart of a semiconductor equipment control method in accordance with an exemplary embodiment of the present invention.

Figure 3:
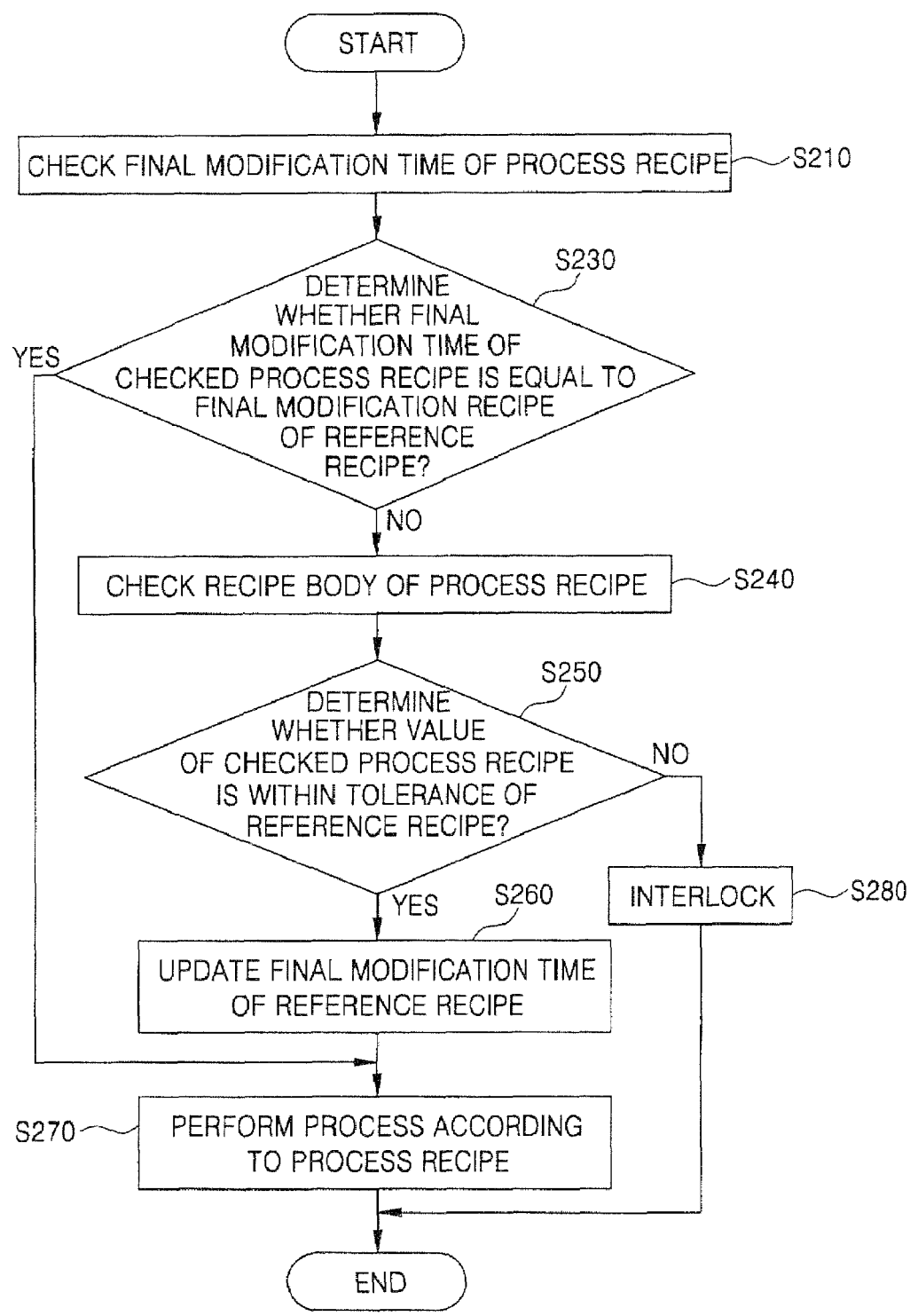
FIG. 3 is a flowchart illustrating a semiconductor equipment control method in accordance with an exemplary embodiment of the present invention.

Referring to FIGS. 2 and 3, when a lot (typically consisting of about 25 wafers) is loaded into a load port of the semiconductor equipment 130 and after a process recipe 136 that corresponds to the lot is found, the host 110 of the semiconductor equipment control system 100 preferably checks a final modification time T1 of the process recipe 136 (S210). Checking the final modification time T1 of the process recipe 136 may be performed by instructing the host 110 to request the final modification time T1 of the process recipe 136 from the semiconductor equipment 130 through the network. The semiconductor equipment 130 may then be instructed to provide the final modification time T1 of the process recipe 136 to the host 110.

The host 110 then compares the final modification time T1 of the process recipe 136 with a final modification time T2 of a corresponding reference recipe stored in a database 115 of the host to determine whether the final modification times T1 and T2 are equal to each other (S230). If the final modification time T1 of the process recipe 136 is equal to the final modification time T2 of the reference recipe, the host 110 then transmits a control signal to the semiconductor equipment 130 to perform a process according to the process recipe 136 (S270). On the other hand, if the final modification time T1 of the process recipe 136 is different from the final modification time T2 of the reference recipe, the host 110 checks the recipe body of the process recipe 136 (S240).

Checking the recipe body of the process recipe 136 may be performed by instructing the host 110 to request data corresponding to the recipe body from the semiconductor equipment 130. The semiconductor equipment 130 may then be instructed to provide the recipe body information to the host 110. The host 110 then compares values of the process recipe 136 with values for the reference recipe conditions, and determines whether the values of the process recipe 136 being checked are within an allowable tolerance range of the reference recipe values (S250). If the process recipe 136 is within tolerance of the reference recipe, the host 110 preferably updates the final modification time T2 of the reference recipe stored in the host database 115 to be equal to the final modification time T1 of the process recipe 136 (S260). The host 110 may thereafter or simultaneously control the semiconductor equipment 130 to perform a process according to the process recipe 136 (S270). If, on the other hand, the value of the checked process recipe 136 is not within tolerance of the reference recipe, the host 110 may instruct the semiconductor equipment 130 to interlock the process (S280).

As described above, this semiconductor equipment control method preferably only checks the contents of the recipe body of the process recipe against the contents of the recipe body of the reference recipe when the final modification time of the process recipe is different from the final modification time of the reference recipe. According to principles of the present invention, it is therefore possible to reduce time loss resulting from unconditionally checking the recipe body of the process recipe.

FIG. 4 is a schematic block diagram of a semiconductor equipment control system 100' in accordance with another exemplary embodiment of the present invention. The semiconductor equipment control system 100' is similar to the semiconductor equipment control system 100 shown in FIG. 2 in many respects. A detailed description of those features previously described with respect to the embodiment shown in FIG. 2 will therefore be omitted.

Referring to FIG. 4, the semiconductor equipment control system 100' includes a plurality of pieces of semiconductor equipment 140. Each piece of semiconductor equipment 140 may include a plurality of process chambers 142 for performing the same process or different processes. Each piece of semiconductor equipment 140 also preferably includes a plurality of process recipes 146 corresponding to the respective chambers 142. Accordingly, a host 110 of the semiconductor equipment control system 100' preferably compares a final modification time of each process recipe 146 with a final modification time of a corresponding reference recipe. The comparison is therefore performed with respect to each chamber 142 rather than with respect to each piece of equipment 140. The semiconductor equipment 140 can then be controlled using the control method described previously based on the result of each comparison.

More particularly, when the process recipe 146 has the same final modification time as the corresponding reference recipe stored in the host 110, the respective process chamber 142 performs a process according to the process recipe 146 without checking the recipe body of the process recipe 146. On the other hand, when the process recipe 146 has a final modification time that is different from the corresponding reference recipe stored in the host 110, the corresponding process chamber 142 performs the process only if the process recipe body is within tolerance of the reference recipe body. The recipe body of the process recipe 146 must therefore be checked and compared to the reference recipe body using the host 110 (as described previously), only if the final modification times are different.

Accordingly, even though the semiconductor equipment 140 includes a plurality of process chambers 142, the host 110 only checks the recipe body for a given process chamber 142 if the final modification time of the process recipe 146 corresponding to that process chamber 142 is different from a corresponding final modification time of a reference recipe. Using a semiconductor equipment control method in accordance with the principles of the present invention, it is therefore possible to more rapidly perform the semiconductor manufacturing process.

As described above, a system according to principles of the present invention preferably compares the final modification times of the process recipe and the reference recipe to determine whether or not to check the recipe body of the process recipe. In other words, each recipe version may be used to determine whether or not to check the recipe body of the process recipe, or a determination symbol may be added to determine whether a separate modification has been made to each recipe.

According to principles of the present invention, since a recipe body of a process recipe is checked only when the process recipe stored in semiconductor equipment has been modified by a manager or a controller, it is possible to appropriately perform a process while minimizing an amount of time taken to check the recipe body of the process recipe. It is therefore possible to more rapidly perform the semiconductor manufacturing process to maximize productivity.

While this invention has been described in connection with what are presently considered to be the most practical and preferred embodiments, it is to be understood that the invention is not limited to the disclosed embodiments, but is instead intended to cover various modifications thereto within the spirit and the scope of the invention as set forth in the following claims.

What is claimed is:

1. A semiconductor equipment control system comprising:
   semiconductor equipment having a process recipe stored therein, said process recipe having a final modification time;
   a host connected to the semiconductor equipment through a network, said host having a database in which a reference recipe is stored, said reference recipe having a final modification time; and
   wherein said host is configured to compare the final modification time of the process recipe with the final modification time of the reference recipe to determine whether to perform a process according to the process recipe.

2. The semiconductor equipment control system according to claim 1, wherein:
   the host is configured to check a recipe body of the process recipe when the final modification time of the process recipe is different from the final modification time of the reference recipe; and
   the host is configured to instruct the semiconductor equipment to perform the process according to the process recipe when the final modification time of the process recipe is equal to the final modification time of the reference recipe.

3. The semiconductor equipment control system according to claim 2, wherein the recipe body comprises a process environment, a process sequence, and a process type.

4. The semiconductor equipment control system according to claim 2, wherein the host is configured to check the recipe body of the process recipe by comparing values of the process recipe and the reference recipe and determining whether the values of the process recipe are within an acceptable tolerance range with respect to the values of the reference recipe.

5. The semiconductor equipment control system according to claim 4, wherein the host is configured to update a final modification time of the reference recipe and to perform a process according to the process recipe when the values of the process recipe are within tolerance of the reference recipe values, and wherein the host is configured to interlock the process when the values of the process recipe are not within tolerance of the reference recipe values.

6. A semiconductor equipment control method comprising:
   checking a final modification time of a process recipe stored in semiconductor equipment; and
   comparing the final modification time of the checked process recipe with a final modification time of a reference recipe to determine whether or not to check a recipe body of the process recipe.

7. The semiconductor equipment control method according to claim 6, further comprising checking the recipe body of the process recipe when the final modification time of the process recipe is different from the final modification time of the reference recipe.

8. The semiconductor equipment control method according to claim 7, wherein the recipe body comprises a process environment, a process sequence, and a process type.

9. The semiconductor equipment control method according to claim 7, further comprising comparing a value of the process recipe with a value of the reference recipe, and determining whether the value of the process recipe is within an allowable tolerance range of the reference recipe value.

10. The semiconductor equipment control method according to claim 9, further comprising updating a final modification time of the reference recipe when the value of the process recipe is within the allowable tolerance range of the reference recipe value.

11. The semiconductor equipment control method according to claim 9, further comprising performing a process according to the process recipe when the value of the process recipe is within the allowable tolerance range of the reference recipe value.

12. The semiconductor equipment control method according to claim 9, further comprising interlocking the process when the value of the process recipe is not within the allowable tolerance range of the reference recipe value.

13. The semiconductor equipment control method according to claim 6, further comprising performing a process according to the process recipe when the final modification time of the process recipe is equal to the final modification time of the reference recipe.

14. The semiconductor equipment control method according to claim 6, wherein a plurality of chambers are arranged in the semiconductor equipment and wherein checking the final modification time of the process recipe is performed with respect to each chamber installed in the semiconductor equipment.

15. A semiconductor equipment control method comprising:
- requesting a final modification time of a process recipe from semiconductor equipment connected to a host through a network;
- providing information containing the final modification time of the process recipe from the semiconductor equipment to the host;
- comparing the final modification time of the process recipe with a final modification time of a corresponding reference recipe stored in the host; and
- transmitting a control signal from the host to the semiconductor equipment to instruct the semiconductor equipment to perform a process according to the process recipe when the final modification time of the process recipe is equal to the final modification time of the reference recipe.

16. The semiconductor equipment control method according to claim 15, further comprising checking a recipe body of the process recipe when the final modification time of the process recipe is different from the final modification time of the reference recipe.

17. The semiconductor equipment control method according to claim 16, wherein the recipe body comprises a process environment, a process sequence, and a process type.

18. The semiconductor equipment control method according to claim 16, further comprising comparing a value of the process recipe with a value of the reference recipe, and determining whether the value of the process recipe is within a tolerance range of the reference recipe value.

19. The semiconductor equipment control method according to claim 18, further comprising:
- controlling the semiconductor equipment to perform a process according to the process recipe when the value of the process recipe is within the tolerance range of the reference recipe value; and
- controlling the semiconductor equipment to interlock the process when the value of the checked process recipe is not within the tolerance range of the reference recipe value.

20. The semiconductor equipment control method according to claim 18, further comprising updating the final modification time of the reference recipe stored in the host to be equal to the final modification time of the process recipe when the value of the process recipe is within the tolerance range of the reference recipe value.

* * * * *